United States Patent
Chae et al.

(10) Patent No.: US 9,986,451 B2
(45) Date of Patent: May 29, 2018

(54) METHOD FOR TRANSCEIVING SIGNAL THROUGH AT LEAST TWO DATA STREAMS IN A WIRELESS COMMUNICATION SYSTEM

(71) Applicants: LG ELECTRONICS INC., Seoul (KR); Industry-Academic Cooperation Foundation, Yonsei University, Seoul (KR)

(72) Inventors: Hyukjin Chae, Seoul (KR); Byoung-Yoon Min, Seoul (KR); Kiyeon Kim, Seoul (KR); Dong Ku Kim, Seoul (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 1025 days.

(21) Appl. No.: 14/299,676

(22) Filed: Jun. 9, 2014

(65) Prior Publication Data

US 2014/0364133 A1 Dec. 11, 2014

Related U.S. Application Data

(60) Provisional application No. 61/832,157, filed on Jun. 7, 2013.

(51) Int. Cl.
| | |
|---|---|
| *H04W 72/00* | (2009.01) |
| *H04W 24/08* | (2009.01) |
| *H04W 72/12* | (2009.01) |
| *H04B 7/024* | (2017.01) |
| *H04B 7/06* | (2006.01) |

(52) U.S. Cl.
CPC ............ *H04W 24/08* (2013.01); *H04B 7/024* (2013.01); *H04B 7/0626* (2013.01); *H04W 72/1226* (2013.01)

(58) Field of Classification Search
CPC ... H04W 24/08; H04W 72/02; H04W 76/023; H04W 8/005
USPC ......... 455/67.11, 67.13, 226.1, 226.2, 226.3, 455/226.4, 450, 464, 509, 451, 452.1, 455/452.2, 453, 454, 426.1, 456.1
See application file for complete search history.

(56) References Cited

U.S. PATENT DOCUMENTS

| | | | |
|---|---|---|---|
| 2010/0103834 A1* | 4/2010 | Gorokhov | H04L 1/0002 370/252 |
| 2013/0294296 A1* | 11/2013 | Dimou | H04W 72/082 370/280 |

\* cited by examiner

*Primary Examiner* — Lester Kincaid
*Assistant Examiner* — Sayed T Zewari
(74) *Attorney, Agent, or Firm* — Birch, Stewart, Kolasch & Birch, LLP

(57) ABSTRACT

A method is provided for transceiving a signal through at least two data streams in a wireless communication system. A first base station measures a wireless channel state for a link with a second base station by using an orthogonal pilot signal. The first base station receives channel status information related to a link of a first mobile station from the first mobile station, channel status information related to a link of a second mobile station from the second mobile station, and channel status information related to a device-to-device (D2D) link from the second mobile station. The D2D link is a channel link between the mobile stations. The first base station exchanges the received channel status information with the second base station, the first mobile station and the second mobile station using a broadcast signal, and determines data stream directions of the first base station and the second base station.

13 Claims, 10 Drawing Sheets

[Figure 1]
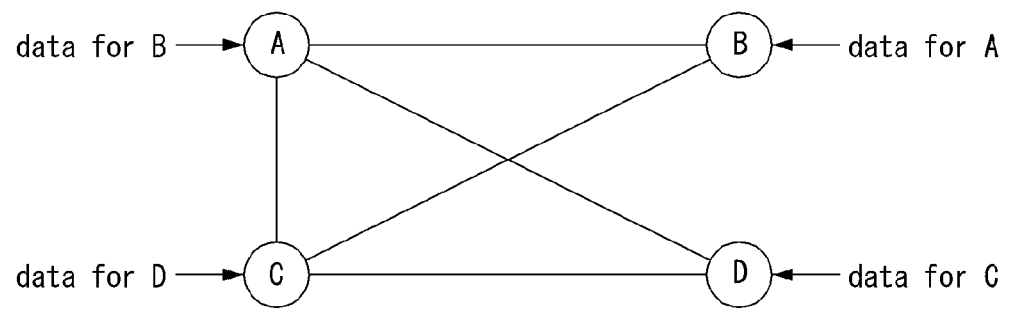
[Figure 2]
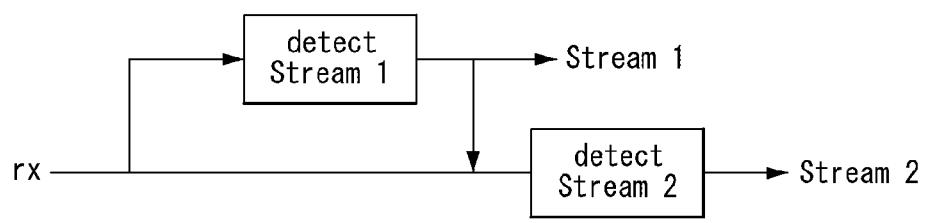

[Figure 3]
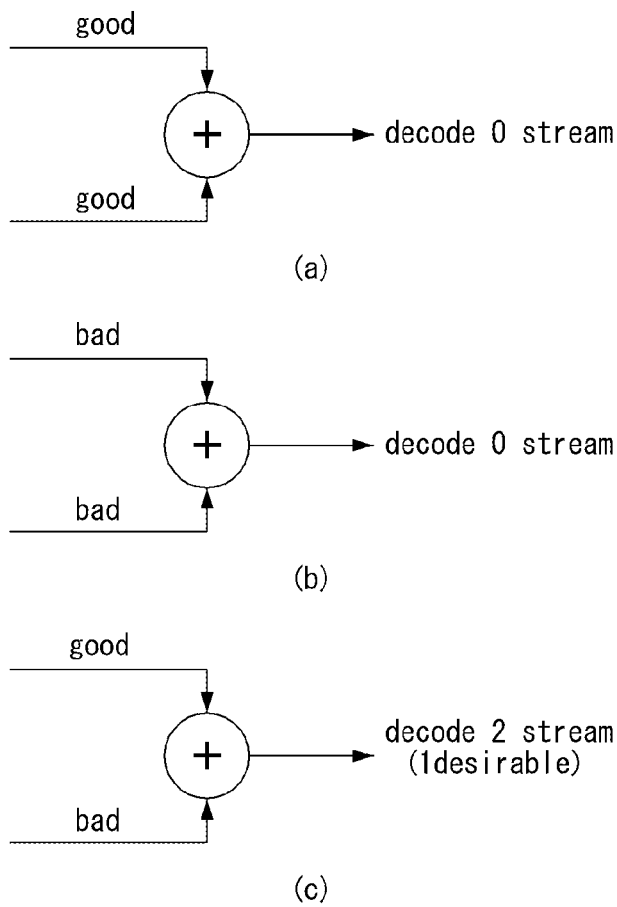
[Figure 4]
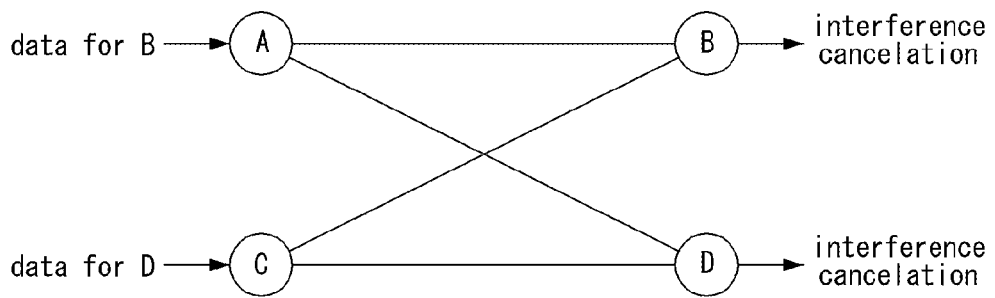

【Figure 5】
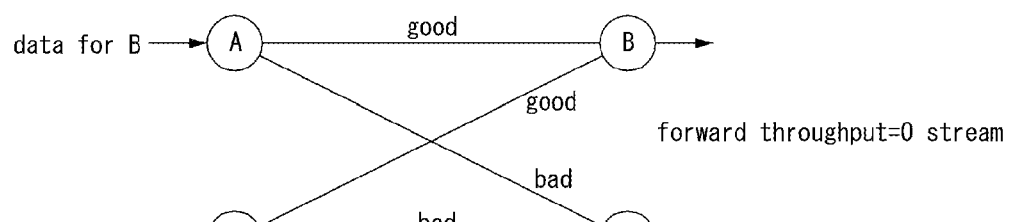
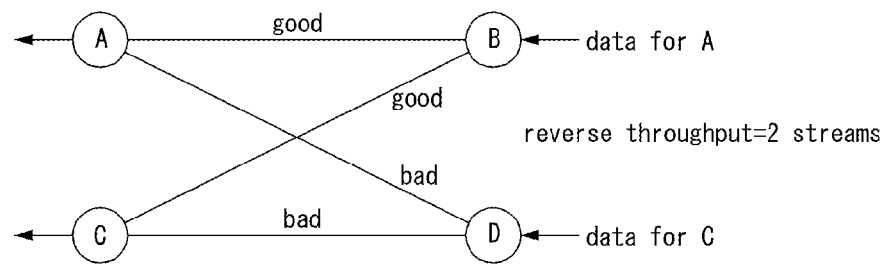

[Figure 6]
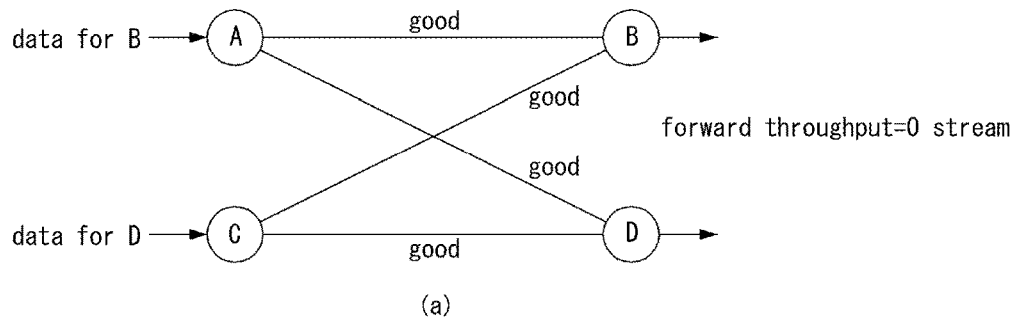
(a)
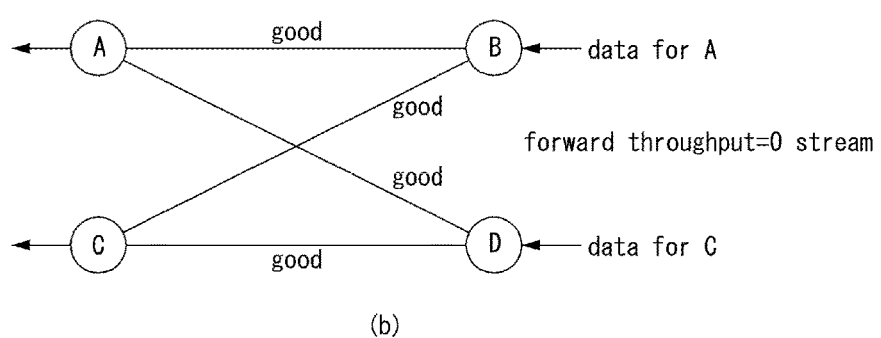
(b)
[Figure 7]
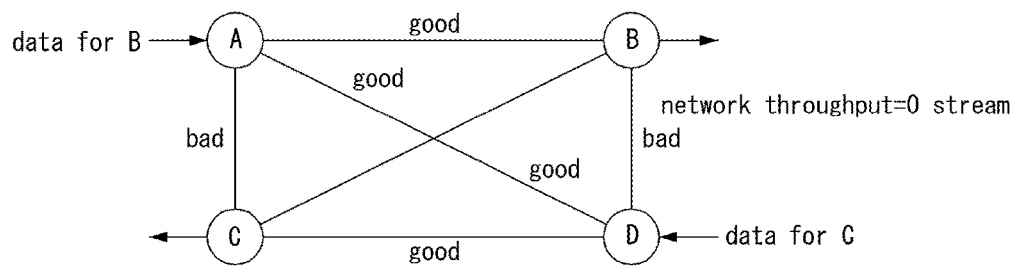

【Figure 8】
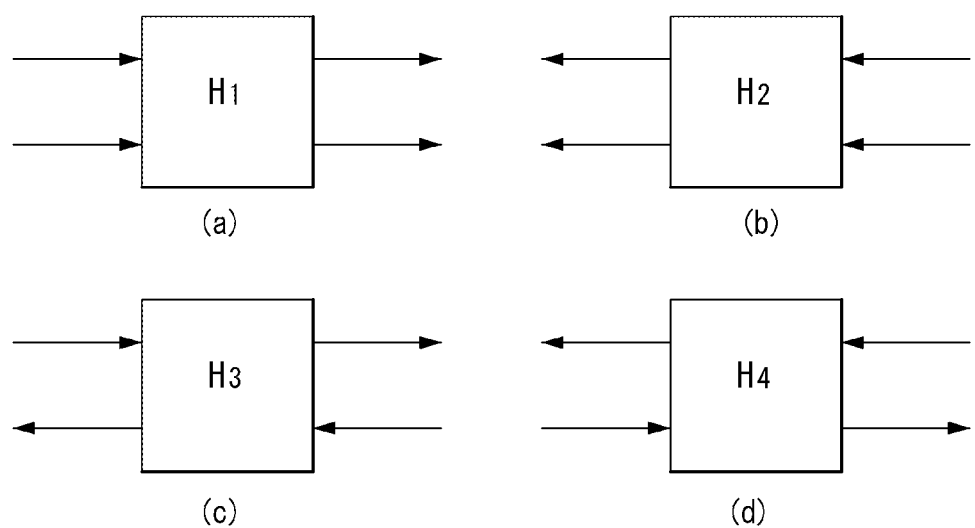

[Figure 9]
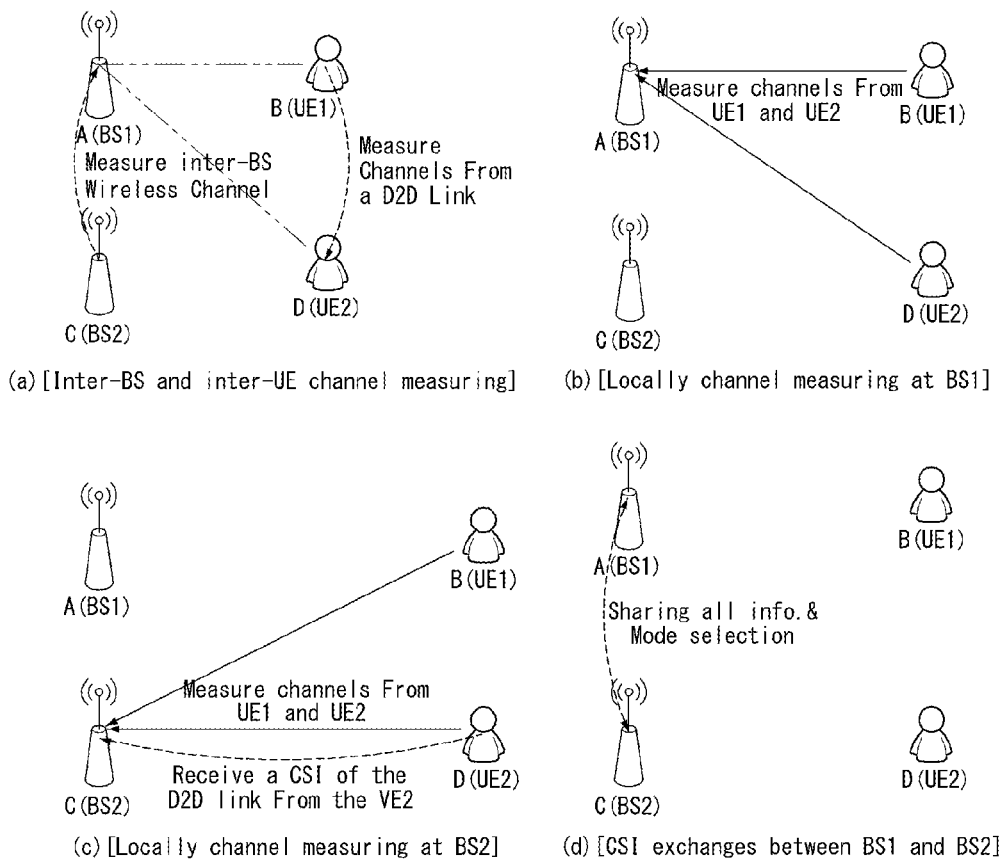
(a) [Inter-BS and inter-UE channel measuring]
(b) [Locally channel measuring at BS1]
(c) [Locally channel measuring at BS2]
(d) [CSI exchanges between BS1 and BS2]

[Figure 10]
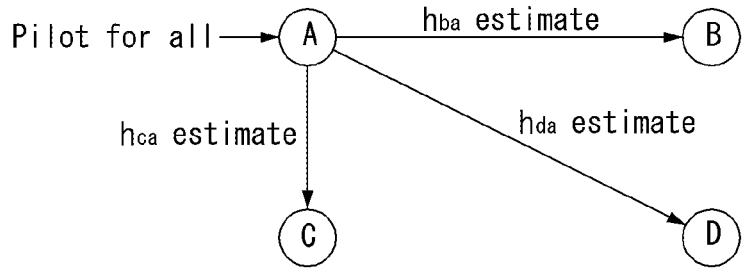
(a) [Channel estimation from pilot of the node A]
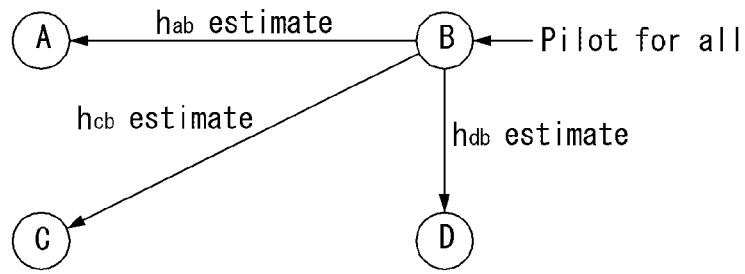
(b) [Channel estimation from pilot of the node B]
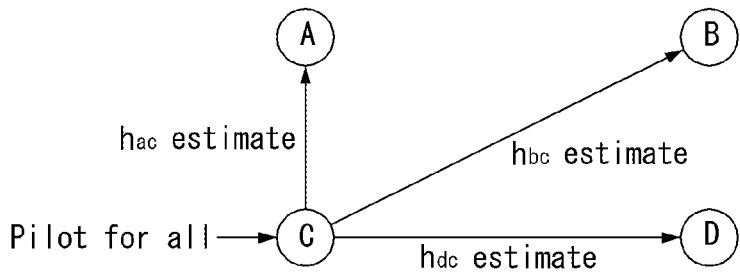
(c) [Channel estimation from pilot of the node C]
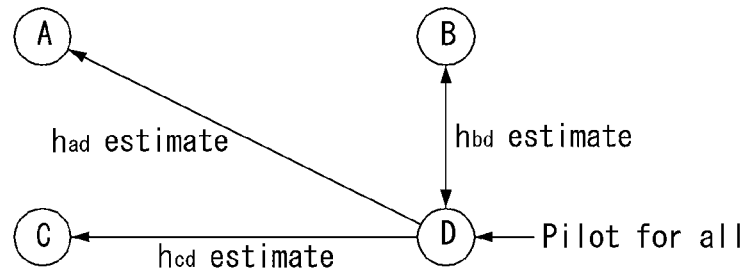
(d) [Channel estimation from pilot of the node D]

[Figure 11]
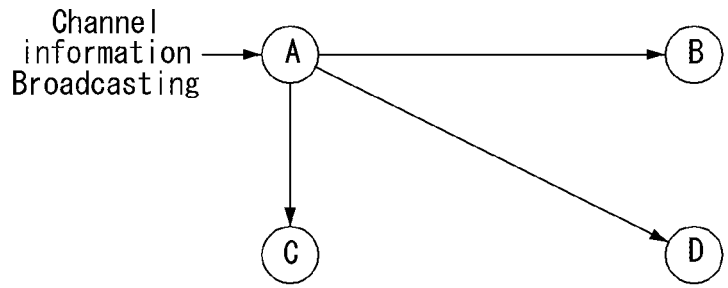
(a) [Channel information exchange from the node A]
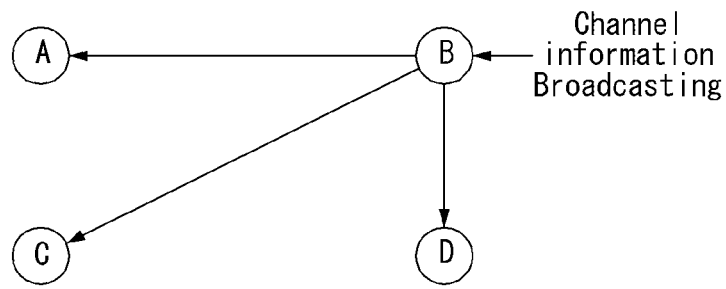
(b) [Channel information exchange from the node B]
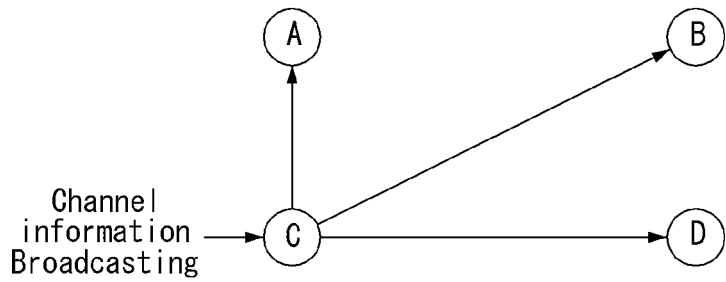
(c) [Channel information exchange from the node C]
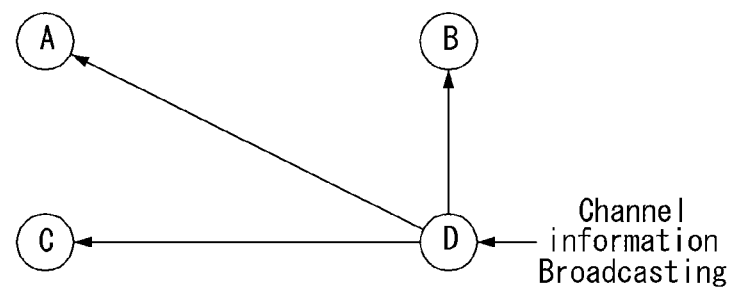
(d) [Channel information exchange from the node D]

[Figure 12]
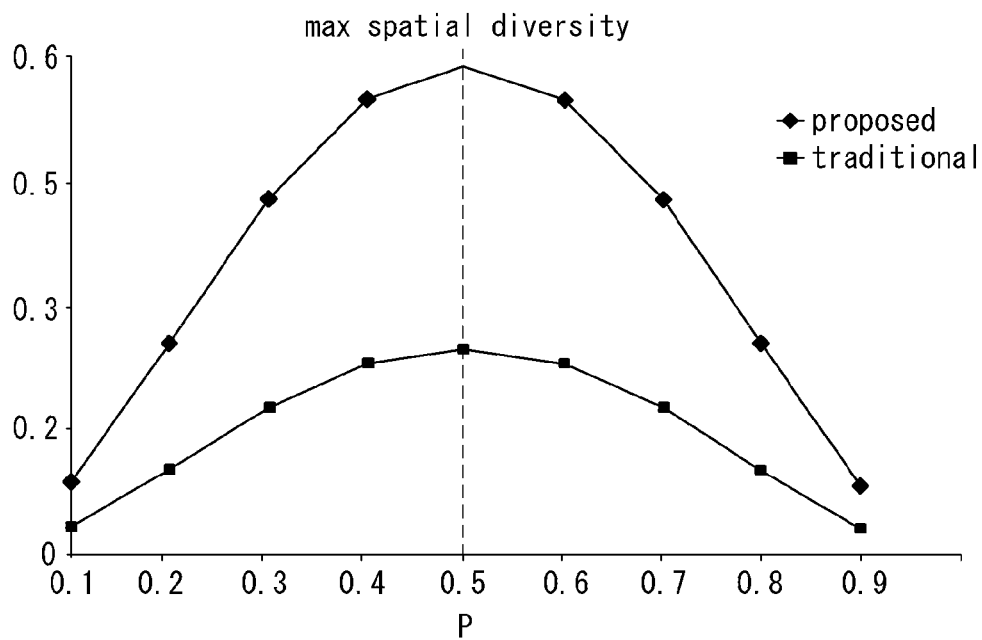
[Figure 13]
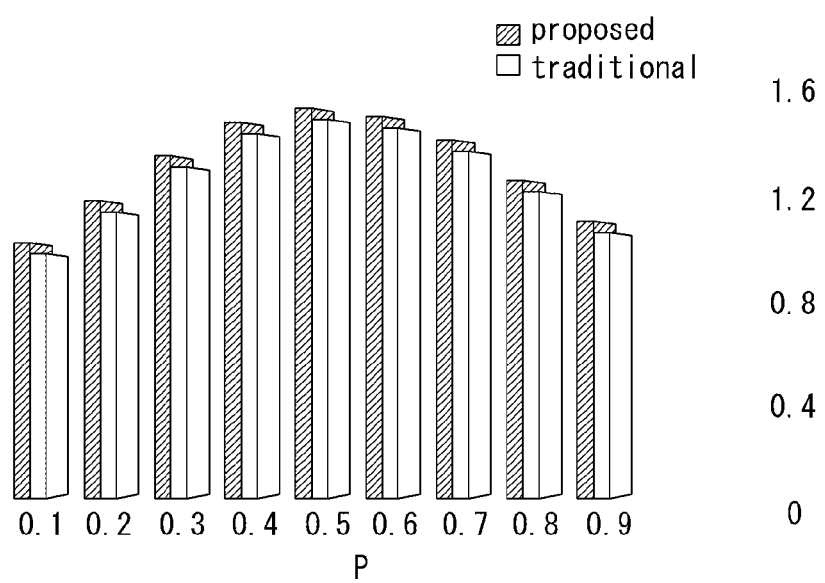

[Figure 14]
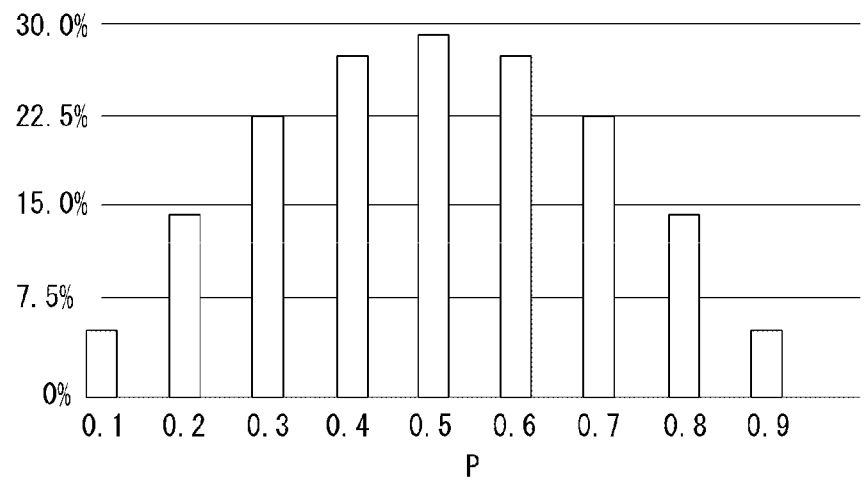
[Figure 15]
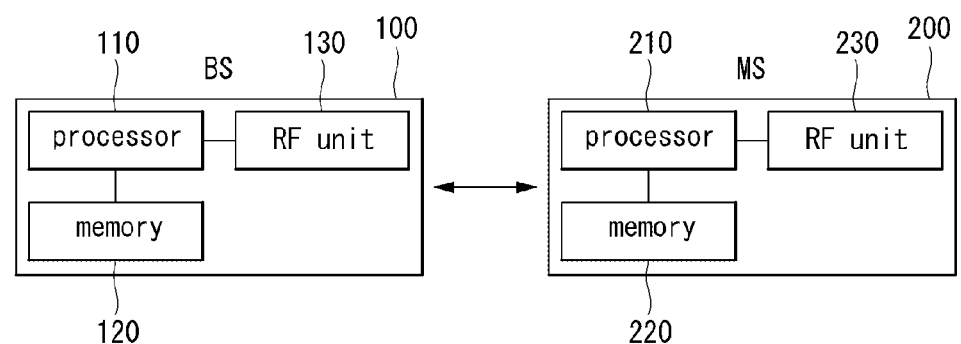

METHOD FOR TRANSCEIVING SIGNAL THROUGH AT LEAST TWO DATA STREAMS IN A WIRELESS COMMUNICATION SYSTEM

CROSS-REFERENCE TO RELATED APPLICATIONS

This application claims priority to Provisional Application No. 61/832,157 filed on 7 Jun. 2013 in US, the entire contents of which is hereby incorporated by reference in its entirety.

BACKGROUND OF THE DISCLOSURE

1. Field of the Disclosure

The present invention relates to a wireless access system, and more particularly, to a method of performing resource stream alignment and an apparatus for supporting the same in a wireless access system supporting multi cell and device-to-device communication.

2. Background of the Disclosure

It is commonly believed that future cellular networks need to be headed for more efficient harvesting and organization of existing spectral resources. Efficient reuse of the existing spectrum is heavily emphasized for next generation mobile networks (NGMN), characterized by heterogeneous and highly dense cell deployments. What we should carefully consider, however, is that the dense deployment of cellular networks occurs generating even more severe interferers from proximate areas. Hence, most users/nodes for wireless communications tend to inevitably suffer strong interference-limited regime, in particular as frequency reuse factor approximately converges to 1 due to spectrum scarcity. On the other hand, heterogeneous cell deployments induce various types of interference among hierarchical cell structures.

Multi-cell/layer coordination and cooperation techniques promise to unravel the aforementioned problems. After IEEE 802.16m [1] defines the first prototype of cooperation protocols, there are four classified ways of multi-cell/layer cooperation mostly concerned: inter-cell interference coordination, joint beamforming requiring shared channel state information (CSI), non-coherent joint transmission requiring shared user data but no CSI, and joint signal transmission requiring both shared user data and CSI. It is currently investigated and partially standardized in 3GPP LTE [2] that cooperative multi-point (CoMP) and inter-cell interference coordination (ICIC) promise to achieve significant gains because of its possibility to eliminate interferences. Recently, network assisted interference cancellation and suppression (NAICS) [3] can realize the desire for practical implementation of 1) linear minimum mean squared error (MMSE) and interference rejection combiner (IRC), 2) successive interference cancellation (SIC), and 3) maximum likelihood detector, in particular to evaluate potential gains of advanced user equipment (UE) receivers with network assistance.

Under the tendency of networks being smaller and denser cell deployments, moreover, the number of UEs per serving cell is also decreased. Different from a symmetric uplink-downlink (UL-DL) assignment in conventional ways, these small number of UEs to be served makes traffic rate demands and channel conditions more dynamic; thus it may require a re-distribution of UL-DL resources within a cell. An asymmetric UL-DL assignment brings out different kinds of interference due to the traffic adaptation in adjacent cells, especially on time division duplex (TDD). The technique currently considered in this situation, namely enhancements to LTE TDD for DL-UL interference management and traffic adaptation (eIMTA) [4], provides mechanisms that allow dynamic switching between UL-DL TDD resources.

[1] IEEE Computer Society, "IEEE standard for local and metropolitan area networks—part 16: air interface for broadband wireless access systems," IEEE, Tech. Rep., May 2011.

[2] 3GPP, "Work item: coordinated multi-point operation for LTE," 3GPP, Tech. Rep., March 2012.

[3] 3GPP, "Study on network-assisted interference cancellation and suppression for LTE," 3GPP, Tech. Rep., February 2013.

[4] 3GPP, "Evolved universal terrestrial radio access (E-UTRA); Further enhancement to LTE time division duplex (TDD) for downlink-uplink (DL-UL) interference management and traffic adaptation," 3GPP, Tech. Rep., June 2012.

[5] S. Alamouti, "A simple transmit diversity technique for wireless communications," IEEE J. Select. Areas Commun., vol. 16, pp. 1451-1458, October 1998.

SUMMARY OF THE DISCLOSURE

In order to satisfy aforementioned research flows, we propose a novel technique, namely resource stream alignment. In a traditional design such as a symmetric UL-DL assignment, we need not to exploit UL-DL traffic asymmetry since the large number of UEs per macro-cell constitutes static traffic rates in ergodic senses. However, we should deeply consider dynamically changing the pattern of UL-DL resources and solutions for including a dynamic traffic adaptation of cells. Resource stream alignment (RSA) is originally motivated by this question; How can UL-DL streams be aligned to enhance interference management?

As we previously discussed, dynamic traffic rate demands and channel conditions liberate the UL-DL assignment, which means more wireless flows reveal. RSA technique allows to choose an optimal interference management and avoid severe interference-limited regime. For instance in a two-user interference channel with four nodes $\{u_1, u_2, u_3, u_4\}$, there are 6 feasible transmitter-receiver (Tx-Rx) pairs: $\{u_1,u_2\} \rightarrow \{u_3,u_4\}$, $\{u_1,u_3\} \rightarrow \{u_2,u_4\}$, $\{u_1,u_4\} \rightarrow \{u_2,u_3\}$, $\{u_2,u_3\} \rightarrow \{u_1,u_4\}$, $\{u_2,u_4\} \rightarrow \{u_1,u_3\}$, and $\{u_3,u_4\} \rightarrow \{u_1,u_2\}$.

What we have to elude is signal-to-interference ratio (SIR)) being an unit, which happens both of desired and interference links are weak or strong. Interference cancellation/suppression can make the desired and interference stream both decodable such in very high (SIR>>1) or low (SIR<<1) SIR conditions. Therefore, we propose the selection techniques to artificially make up stream decoupling conditions and investigate the potential gains in diversity and throughput measures. Let us suppose that 2-stream decidability and UL-DL traffic asymmetry can be feasible by NAICS and eIMTA solutions, then demonstrate the details in the sequel.

In accordance with one aspect of the present invention, a method for performing resource stream alignment (RSA) to be able communication through two data streams in a wireless communication system supporting multi cell, the method comprising: measuring wireless channel state between the first base station and the second base station by using an orthogonal pilot signal, wherein the wireless channel state is measured by the first base station or the second base station; receiving, by the first base station, a channel status information related to a link of the first mobile station from the first mobile station; receiving, by the first base station, a channel status information related to a link of the second mobile station from the second mobile station; receiving, by the second base station, a channel status information related to a link of the first mobile station from the first mobile station; receiving, by the second base station, a channel status information related to a link of the second mobile station from the second mobile station; receiving, by the second base station, a channel status information related to a device-to-device (D2D) link from the second mobile station, wherein the D2D link is a channel link between the first mobile station and the second mobile station; exchanging channel status informations received at each base station between the first base station and the second base station; and determining data stream directions of the first base station and the second base station based on the exchanged channel status informations.

In accordance with another aspect of the present invention, wherein the data stream directions of the first base station and the second base station are determined by using channel state quality information of data streams between each base station and each mobile station, fixed rate coding information and sum of the fixed rate coding information.

In accordance with another aspect of the present invention, wherein the device-to-device link is controlled by the first base station or the second base station.

In accordance with another aspect of the present invention, wherein the frequency used in the device-to-device link is equal to the frequency of the base station controlling the device-to-device link.

In accordance with another aspect of the present invention, a method for performing resource stream alignment (RSA) to be able communication through two data streams in a wireless communication system supporting device-to-device communication, the method comprising: measuring channel state between mobile stations by using a pilot signal; exchanging channel state information measured at each mobile station with neighbor mobile stations; and determining at least one pairs of transmitting mobile station-receiving mobile station for the best device-to-device communication based on the exchanged channel state information.

In accordance with another aspect of the present invention, further comprising: transmitting a pilot signal for measuring channel state between mobile stations from at least one mobile stations to neighbor mobile stations; and measuring channel state of the at least one mobile stations based on the received pilot signal at the mobile stations which the pilot signal is received.

In accordance with another aspect of the present invention, further comprising: forming at least one pair of mobile stations for a device-to-device communication; randomly initiating data stream directions of the mobile stations; computing an interference reduction value at each pair of the mobile stations if any of the mobile stations fails the decoding of data stream; and updating the data stream directions of the mobile stations in each pair of mobile stations by comparing the measured interference reduction and a predetermined value.

In accordance with another aspect of the present invention, wherein the interference reduction value is defined as $\Delta_n = SINR(\overline{D_n}) - SINR(D_n)$, wherein the SINR denotes a Signal to Interference-plus-Noise Ratio, the $D_n$ denotes the direction of the n-th data stream, where 0 and 1 represent a forward direction and a reverse direction of data stream, respectively. Wherein the complementary value of $D_n$ is represented by $\overline{D_n}$.

In accordance with another aspect of the present invention, wherein the step of updating comprises if the interference reduction value is greater than or equal the predetermined value, the data stream directions of the mobile stations are changed to the opposite direction, and if the interference reduction value is smaller than the predetermined value, the data stream directions of the mobile stations are not changed to the opposite direction.

In accordance with another aspect of the present invention, wherein the predetermined value is 0.

In accordance with another aspect of the present invention, further comprising: transmitting the state value of the updated data stream directions from the mobile stations to neighbor mobile stations.

In accordance with another aspect of the present invention, further comprising: executing the step of changing the data stream directions a predetermined number of times; turning off the data stream of a mobile station if the decoding through data stream of the mobile station fails when the step of changing the data stream directions are executed by the predetermined number of times; checking whether the data streams of neighbor mobile stations are all successful for decoding through binary feedback information; and deactivating the data stream of the mobile station if any one of data streams of the neighbor mobile stations is successful for decoding as a result of the checking.

In accordance with another aspect of the present invention, wherein the pilot signal is sequentially transmitted at the each mobile station.

In accordance with another aspect of the present invention, wherein the channel status information related to the D2D link is transmitted from the first mobile station to the second mobile station.

In accordance with another aspect of the present invention, wherein the wireless channel state is measured by the first base station, wherein the step of measuring wireless channel state comprising: receiving, by the first base station, a reference signal (RS) for measuring channel state of a wireless link related to the second base station from the second base station; and transmitting, by the first base station, a channel status information of the wireless link to the second base station using a wired backhaul or a wireless backhaul.

In accordance with another aspect of the present invention, wherein information related to the reference signal is predetermined between the first base station and the second base station.

In accordance with another aspect of the present invention, wherein the information related to the reference signal comprises at least one of a period for transmitting the reference signal, a type of the reference signal or a port number.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1 illustrates two-user interference two-way communication system model;

FIG. 2 illustrates a block diagram of the interference cancelation;

FIG. 3(a) illustrates an interference cancelation when all channel state are good;

FIG. 3(b) illustrates an interference cancelation when all channel state are bad;

FIG. 3(c) illustrates an interference cancelation when desired channel state is good and the others is bad;

FIG. 4 illustrates traditional one-way interference channel;

FIG. 5(a) illustrates an example for choosing forward/reverse transmission when forward throughput=0;

FIG. 5(b) illustrates an example for choosing forward/reverse transmission when reverse throughput=2;

FIG. 6(a) illustrates all channel have good state when forward throughput=0;

FIG. 6(b) illustrates all channel have good state when reverse throughput=0;

FIG. 7 illustrates an example of opposite transmission with network throughput=2;

FIG. 8(a) illustrates a forward transmission type;

FIG. 8(b) illustrates a reverse transmission type;

FIG. 8(c) illustrates an opposite transmission 1 type;

FIG. 8(d) illustrates an opposite transmission 2 type;

FIG. 9(a) illustrates inter-BS and inter-UE channel measuring represented a first step signaling patterns for RSA in a two-user interference channels;

FIG. 9(b) illustrates locally channel measuring at BS1 represented a second step signaling patterns for RSA in a two-user interference channels;

FIG. 9(c) illustrates locally channel measuring at BS2 represented a third step signaling patterns for RSA in a two-user interference channels;

FIG. 9(d) illustrates exchanging between BS1 and BS2 represented a fourth step signaling patterns for RSA in a two-user interference channels;

FIG. 10 illustrates channel measurement stage in D2D communications;

FIG. 11 illustrates channel information exchange stage in D2D communications;

FIG. 12 illustrates the probability of supporting 2 streams decodable;

FIG. 13 illustrates absolute network throughput gain as a function of probability p;

FIG. 14 illustrates relative throughput gain as a function of probability p; and FIG. 15 is a block diagram of a wireless communication apparatus according to an embodiment of the present invention.

DETAILED DESCRIPTION OF THE PREFERRED EMBODIMENTS

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, a description is made centering on a data transmission and reception relationship between a BS and a UE. Here, the BS may be a terminal node of a network, which directly communicates with the terminal. In some cases, a specific operation described as performed by the BS may be performed by an upper node of the BS. Namely, it is apparent that, in a network comprised of a plurality of network nodes including a BS, various operations performed for communication with a terminal may be performed by the BS, or network nodes other than the BS. The term 'BS' may be replaced with the term 'fixed station', 'Node B', 'enhanced Node B (eNode B or eNB)', 'access point', 'Node' etc. The term 'relay' may be replaced with the term 'relay node (RN)', 'relay station (RS)', 'Node' etc.

The term 'terminal' may be replaced with the term 'user equipment (UE)', 'Mobile Station (MS)', 'Mobile Subscriber Station (MSS)', 'subscriber station (SS)', 'Node' etc.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

We consider a simple network system model 2 pairs of transmitters and receivers in FIG. 1. There are 6 independent links and each fading channel has only two states, good or bad. Hence, binary channel gains are represented as equation 1

$$\{h_{ab}, h_{cd}, h_{ad}, h_{cb}, h_{ac}, h_{bd}\} \subset \{g, b\}, \quad \text{[equation 1]}$$

g: goodchannelstate,
b: badchannelstate.

where $h_{ij}$ is the fading channel from j transmitter to the i receiver, good or bad channel state can be defined as SNR(Signal-to-noise ratio) is greater or less than a given threshold and the thresholds for good channel and bad channel could be different and configured by network or a UE. Two mixed streams can be decoupled if their powers are quite different by interference cancelation [5].

FIG. 2 illustrates block diagram of a simple interference cancelation. We assume that the fixed coding rate is $\log_2(1+\theta)$ and $P_j$ is a transmitted power of j transmitter. n depicts noise variance. detect stream 1 can be successfully detected under the conditions below equation 2 and equation 3, $$\frac{P_1}{n+P_2} \geq \theta, \quad \text{[equation 2]}$$

$$\frac{P_2}{n} \geq \theta, \quad \text{[equation 3]}$$

condition for detecting for stream 2.

And p is the probability a channel is in the good state as equation 4.

$$p=Pr(h=g)-=1-Pr(h=b). \quad \text{[equation 4]}$$

Thus, p=0.5 means highly random channels and a high level of spatial diversity. For ease of analysis, we assume whole transmit power are equal to 1 and $g/(n+b) \geq \theta$, $b/n \geq \theta$ in the remain parts.

There are two detection classes depending on whether they receive the signal through the same channel state or not. Consider the plot in FIG. 3, showing the the number of decodable streams in two detection classes. If desired and interference channel states are same, we cannot decode any stream. However, although desired channel state is bad, we can decode the desired signal when interference channel state is good. There is a need a way how to be able to support 2 simultaneous data streams.

3.1 Traditional One-Way Communication

In this chapter, we present the conventional one-way communication scheme. FIG. 4 demonstrates that traditional one-way communication alternates forward and backward directions. They have only a strategy interference cancelation. Unfortunately, if receiver receive signals from both side through the same channel conditions, there is no way to support 2 streams Hence, for the traditional scheme, the probability of supporting 2 streams is equation 5

$$Pr(N=2)=4p^2(1-P)^2, \quad \text{[equation 5]}$$

where N is the number of supporting streams. The network ergodic throughput can be easily understood as equation 6

$$C=2Pr(N=2)+Pr(N\neq 2)(\text{stream}). \quad \text{[equation 6]}$$

3.2 Proposed Two-Way Communication

In this chapter, we propose two ideas that how to support 2 streams able to be decodable in the two-way communication.

Method 1 (Choose Forward/Reverse Transmission for Both Tx-Rx Pairs Wisely)

We can choose forward or reverse transmission wisely to support 2 streams. For example, if rows of the forward link channel matrix, $H_f$ have identical entries as equation 7

$$H_f = \begin{bmatrix} g & g \\ b & b \end{bmatrix} \quad \text{[equation 7]}$$

that link throughput is equal to 0 as shown in FIG. 5-(a). Then, the reverse link channel matrix, $H_r=H_f^T$, must have different entries which is able to support 2 streams like as FIG. 5-(b). We should select the other direction transmission. In this method, transmits direction for both node pairs is same. To determine transmit direction, both pairs should know the channel state.

Method 2 (Choose Forward/Reverse Transmission Wisely with Allowing that Each Tx-Rx Pair have Different Direction)

However, method 1 cannot provide solution when all channels are same condition. Because rows of the forward link channels and transpose of those also have identical entries. The above situation is described by FIG. 6. To overcome this problem, in this subsection, a new transmission which exploits the interference effect caused by opposite transmission is proposed.

The opposite transmission means that each pair transmits opposite direction simultaneously. In the example as FIG. 7, the pair of A and B selects forward transmission, otherwise, the other pair of C and D transmits reverse direction. The network throughput of opposite transmission is better than reverse/forward selection transmission because there is an additional possibility of channel variation. FIG. 8 depicts four transmission modes considered in the previous sections.

Each mode supports 2 streams if channel matrix has no identical row entries. We can choose any mode for supporting 2 streams. This means that channel diversity can be exploited is lager than traditional one. The probability of supporting 2 streams satisfies equation 8

$$1-Pr(N'=2)=p^2+(1-p)^4p^2-12p^2(1-p)^2+2p(1-p)+8p^3(1-p)^3+(1-p)^2+(1-p)^2, \quad \text{[equation 8]}$$

where N' is the number of the supporting streams with proposed transmissions.

Furthermore, we can easily define the network ergodic throughput is equation 9.

$$C'=2Pr(N'=2)+Pr(N'\neq 2)(\text{stream}). \quad \text{[equation 9]}$$

As described earlier, we basically assume that each node is equipped with interference cancellation receiver, but this invention is not limited to the interference cancellation receiver. In other words, this invention is also applied to the case of each node equipped with linear receiver. If all nodes are equipped with a linear receiver, the transmit direction can be determined for sum performance (e.g. Rate or other scheduler metric) maximization for both Tx-Rx pairs.

4 Details of the Invention: Signaling Pattern

In this section, we consider subsequent signaling patterns for the RSA as discussed in the previous parts. We propose and describe prerequisite conditions based on two different scenarios: 1) in cellular network structures, and 2) in device-to-device communications. Let us assume that channel reciprocity in TDD can be basically utilized and essential patterns are only considered not some efficient schemes to show the main intuition in the sequel. Note that the proposed prerequisite conditions are started from fully-shared CSI among all nodes, and we sequentially suggest the following parts.

4.1 RSA in Cellular Network Structures

There are three big parts for RSA signaling: 1) locally channel measuring for the requisite global CSI, 2) CSI sharing among all nodes to complete the global CSI, and 3) Tx/Rx role decision stage. Now, we illustrate how these parts can be embraced for the cellular network RSA. Note that there are four nodes {A,B,C,D} which directly matches {BS1,UE1,BS2,UE2} (Roughly see FIG. 9)

4.1.1 Locally Channel Measuring Stage

When each BS gathers all channel information to acquire the global CSI to determine transmission direction, let us propose three different procedures to divide responsibilities and avoid inefficiency or role collision of BSs.

For the first part of this stage, we should assemble 1) an inter-BS wireless channel and 2) an inter-UE channel as we illustrate in FIG. 9 Although there is a backhaul between BS1 and BS2, it is definitely compulsory to measure an inter-BS wireless channel due to the global CSI condition. The inter-BS wireless channel can be obtained by the channel estimation using another orthogonal pilot. In contrast to the inter-BS case, it is more delicate to capture the inter-UE channel. In order to open a reliable link between UE1 and UE2, let BS1 control device-to-device (D2D) links in advance. Assuming that these D2D links operate in the same frequency of cellular networks by BS1's command (some resource sharing for BS1 can be needed to synchronize with other-cell UE, i.e., UE2), then UE2 can finally collect the inter-UE CSI.

FIG. 9 depicts channel measuring of BS1 from UE1 and UE2 in order to gather UE1's desired link and UE2's interference link. Note that it is more efficient when BS do channel estimations rather than UE due to the possibility to use a wireless/wired inter-BS backhaul. For example, if there is inter-BS backhaul each UE feeds its channel states from BS1 and BS2 back to only each desired BS and each BS shares the channel states through the inter-BS backhaul. However, if dual connectivity is guaranteed, each UE can report its channel states to BS1 and BS2 directly.

FIG. 9 also describes channel measuring of BS2: UE1's interference link, and UE2's desired link. Note that previously measured inter-UE channel is delivered by UE2 in this step.

4.1.2 CSI Exchanges Among all Nodes

Sharing all channel information by previously done channel measuring is another important procedure. One great advantage in cellular networks is that the inter-BS CSI sharing can be enough. By the previous stage, BS1 and BS2 obtain {$h_{ab}$, $h_{ad}$, $h_{ac}$} and {$h_{cb}$, $h_{cd}$, $h_{db}$} respectively. Hence, each BS do sharing its own gathered CSI using wireless/wired backhaul. Now, all BSs with the global CSI are ready to execute RSA schemes by the decision process in the subsequent stage.

4.1.3 Tx/Rx Role Decision Stage

Each BS's roles for RSA are intuitively classified into being a transmitter or receiver, and UEs should follow the policies of corresponding BSs. By the aforementioned roles, four different modes can be considered as follows: 1) BS1-Rx & BS2-Rx, 2) BS1-Rx & BS2-Tx, 3) BS1-Tx & BS2-Rx, and 4) BS1-Tx & BS2-Tx. Assuming that the criterion for mode-selection is determined by sum-rate maximization, and we need to define the rate $R_i$ corresponding to i-th mode so as to choose the best mode. Now, we verify the details only for the first mode since other modes are similarly considered in substantial.

In the first mode where all BSs take a role as Rx, there are four subcategories depending on the stream conditions:

State$_1$={$h_{ab}$=g,$h_{ad}$=b,$h_{cb}$=g,$h_{cd}$=b},

State$_2$={$h_{ab}$=g,$h_{ad}$=b,$h_{cb}$=b,$h_{cd}$=g},

State$_3$={$h_{ab}$=b,$h_{ad}$=g,$h_{cb}$=g,$h_{cd}$=b},

State$_4$={$h_{ab}$=b,$h_{ad}$=g,$h_{cb}$=b,$h_{cd}$=g},

Here, we assume all nodes are equipped with interference cancellation receiver. Depending on the channel states, the corresponding sum-rates for mode 1 (BS1-Rx & BS2-Rx) are represented as $$R_{11} = \log_2\left(1 + \frac{h_{ab}P_{MS1}}{h_{ad}P_{MS2}+n}\right) + \log_2\left(1 + \frac{h_{cd}P_{MS2}}{n}\right),$$

$$R_{12} = \log_2\left(1 + \frac{h_{ab}P_{MS1}}{h_{ad}P_{MS2}+n}\right) + \log_2\left(1 + \frac{h_{cd}P_{MS2}}{h_{cb}P_{MS1}+n}\right),$$

$$R_{13} = \log_2\left(1 + \frac{h_{ab}P_{MS1}}{n}\right) + \log_2\left(1 + \frac{h_{cd}P_{MS2}}{n}\right),$$

$$R_{14} = \log_2\left(1 + \frac{h_{ab}P_{MS1}}{n}\right) + \log_2\left(1 + \frac{h_{cd}P_{MS2}}{h_{cb}P_{MS1}+n}\right).$$

where $P_{MS1}$ and $P_{MS2}$ denote the transmit power for MS1 and MS2, respectively. If all nodes are equipped with linear receiver, $R_{12}$ can be only used.

If one BS has interference cancellation receiver, but neighboring BS has not the interference cancellation receiver, R12 and R14 is only used. To calculate sum rate whether each node is capable of interference cancellation or not, we propose that the information of the capability of interference cancellation for BSs and MSs is shared via inter-BS backhaul signaling.

Since each BS has already clues to decide sub-modes based on the global CSI, let $R_1$=$R_{1j}$ where j denotes the best sub-mode for RSA.

After deciding $R_i$, ∀i, the mode-selection problem is ultimately settled as equation 10.

$$\underset{i}{\operatorname{argmax}} R_i, \quad \text{for } i=1,2,3,4. \qquad \text{[equation 10]}$$

Even if real-valued channel states can be further considered such as new criterion by the ratio of good/bad channel values, any details are not considered because the above proposed decision process can be essentially applied.

4.2 RSA in Device-to-Device (D2D) Communications

In this section, we consider D2D environment where a wired/wireless backhaul is not available. D2D communication procedures are organized as follows. We first present the channel measurement stage. The second stage is channel information exchange stage, and we finally do decision and transmit stage. Note that the ultimate goal is to want to decide which nodes are the best transmitter and receivers.

4.2.1 Channel Measurement Stage

One node transmit one pilot at a time where is intended for all nodes. This procedure is needed pilot signaling which have to been recognized by all nodes for measuring channel associated to receiver node. As mentioned above, channel measurement stage is performed by using pilot signal where all nodes already know, as illustrated in FIG. 10. For example, if the node A transmits appointed pilot signal to the others, then the others estimate channel from node A. Node B, node C and node D can estimate their channels, $h_{ba}$, $h_{ca}$ and $h_{da}$ respectively. And then next node transmit pilot signal, the others also estimate their channels. This process which is one time for all nodes is repeated until all nodes transmit pilot signal to the others.

4.2.2 Channel Information Exchanges Stage

After channel measurement stage, there are required exchanging their channel information. Similar to channel measurement stage, only one node broadcast to the other nodes at a time as shown FIG. 11. This channel information may be channel quality information/achievable rate of each pair/channel state information, etc. This channel information may also be quantized or not.

4.2.3 Decision and Transmission Stage

We can assume the four transmit-receiver node pairs denoted [AC-BD], [AD-BC], [BC-AD], [BD-AC]. A key design goal of this stage is to enable efficient communication in D2D. The efficient means that is appropriate for their objective utility, such as sum-rate maximization, outage probability minimization, minimizing mean squared error, etc. This decision stage is analogous to Tx/Rx role decision stage of cellular network structures. However, it is different things that there is no centralized controller or helper to determine the transmit-receiver node pair. Each nodes should choose between transmitter and receiver from obtained information for previous stage. For example, consider following assumptions: given as $\{h_{ab}=g, h_{ac}=b, h_{ad}=g, h_{bd}=b, h_{ba}=b, h_{cd}=g, h_{bc}=g\}$, decision for sum-rate maximizing and channel state information exchanged in second stage.

All channels of transmit-receiver node pairs are consist of $$H_{[AC-BD]} = \begin{bmatrix} g & g \\ g & g \end{bmatrix},$$

$$H_{[AD-BC]} = \begin{bmatrix} g & b \\ b & g \end{bmatrix},$$

$$H_{[BC-AD]} = \begin{bmatrix} g & b \\ b & g \end{bmatrix},$$

$$H_{[BD-AC]} = \begin{bmatrix} g & g \\ g & g \end{bmatrix}$$

from given channel.

In the first stage, all nodes transmit pilot and channel is measured estimation by the other nodes. In the next stage, channel information is exchanged for all nodes. And then, all nodes recognize the $H_{[AC-BD]}$ and $H_{[BD-AC]}$ are not affordable pairs for sum-rate maximization. Therefore, all nodes compare the rates of [AD-BC] and [BC-AD]. And corresponding sum-rates are $$R_{[AD,BC]} = \log_2\left(1 + \frac{h_{ab}P_1}{h_{bd}P_2 + n}\right) + \log_2\left(1 + \frac{h_{cd}P_2}{h_{ac}P_1 + n}\right),$$

$$R_{[BC,AD]} = \log_2\left(1 + \frac{h_{ab}P_1}{h_{ac}P_2 + n}\right) + \log_2\left(1 + \frac{h_{cd}P_2}{h_{bd}P_1 + n}\right).$$

They are able to choose the pair between [AD-BC] and [BC-AD] to maximize sum-rate, then selected transmit nodes start to send their signals.

Hereinafter, a method for choosing between transmitter and receiver at each nodes will be described specifically.

In this section, we propose distributed stream-alignment algorithms designed based on the simple principle of distributed stochastic search from the area of multi-agent systems.

To facilitate exposition, some notation is introduced as follows. Let $D_n$ denote the direction of the n-th stream, where 0 and 1 represent the directions forward direction and reverse direction, respectively. Let the complementary value of $D_n$ be represented by $\overline{D_n}$. The stream alignment algorithm based on DSS is given below.

Algorithm 1. Stream Alignment Algorithm Based on Distributed Stochastic Search (1) Randomly initiate stream directions $D_n \in \{0,1\}$ (2) While (There is Unsuccessfully decoded streams in the network) do Each pair of nodes compute the measure of interference reduction defined as equation 11

$$\Delta_n = \text{SINR}(\overline{D_n}) - \text{SINR}(D_n) \qquad \text{[equation 11]}$$

A pair of nodes, say I, update the state of the stream direction as follow.

Case 1) If the stream is successfully received, namely, $\text{SNR}(X_n) \geq \theta$, remains unchanged.

Case 2) If $\text{SNR}(X_n) < \theta$ and $\Delta_n \leq 0$, the stream direction is changed by setting $D_n = \overline{D_n}$ with probability p.

Case 3) If $\text{SNR}(X_n) < \theta$ and $\Delta_n < 0$, remains unchanged since there is no gain for doing so.

Those nodes updating their stream directions inform their neighbors that are connected by the edges in.

(3) End While

Two remarks are in order. First, the probability p controls the degree of parallel activities. In other words, the larger the p is, more links update their stream directions and vice versa. p=1 is not the optimal choice as shown by experiments. Second, Algorithm 1 does not converge if it is infeasible to support the successful transmission of all data streams in the network. This problem can be solved by limiting the maximum number of iterations as for the next algorithm.

If a network is over constrained (e.g., having too many strongly coupled links), there may not be a feasible stream-alignment solution for supporting all successfully data streams. In this case, it is desirable to turn off certain links such that the remaining links can have successful communication. This can be realized by Algorithm 2 proposed as follows, which builds on Algorithm 1.

Algorithm 2. Modified Stream Alignment Algorithm Based on Distributed Stochastic Search (1) Execute Algorithm 1 with K iterations where K is a constant chosen a prior.

(2) While (Network is infeasible) Do

Consider an arbitrary transmitting node, say $X_n$, with an unsuccessful stream. The node checks by binary feedback if the streams of its neighbors are unsuccessful if the n-th link is turned off. The number of positive feedback is denoted as $S_n$.

If $S_n > 0$, then $X_n$ declares the inactive state and the link is removed from the graph $(X_n, Y_n)$. This alleviates a relatively stringent constraint of the network and increase the probability of achieving network feasibility.

Execute Algorithm 1 with K iterations given the updated the updated graph.

(3) End Do.

In device-to-device network underlay cellular network, $\theta$ can be configured by BS via physical layer signal or higher layer signal, or predetermined. The probability p can be also configured by by BS via physical layer signal or higher layer signal, or predetermined.

5 Description of the Simulation Results

In this section, we describe simple simulation results for the proposed schemes with different P and make comparisons with the traditional systems.

In FIG. 12, we plot the spatial diversity gains related with the probability p. Intuitively, highly random channel conditions promise good opportunity to achieve high level of spatial diversity. Maximum spatial diversity can be achieved when P is 0.5 in both proposed and traditional communications. The reason why the proposed scheme can provide more spatial diversity is that appropriate channel combinations is on the selectivity on all possible ways.

Not only show FIG. 13 and FIG. 14 us additional opportunities for channel diversity, but also network throughput gains from the proposed schemes. Even if additional bandwidth or antennas need not to be required, proposed two-way channel selection schemes is about 30% greater than the traditional one-way communication.

FIG. 15 is a block diagram of a wireless communication apparatus according to an embodiment of the present invention.

Referring to FIG. 15, a wireless communication system includes a BS 100 and a plurality of MSs 200 belonging to the BS 100. The MSs 200 include both the aforementioned legacy-UE and e-UE.

The BS 100 includes a processor 110, a memory 120, a radio frequency (RF) unit 130. The processor 110 may be configured to implement the functions, procedures and/or methods proposed by the present invention. Layers of a wireless interface protocol may be implemented by the processor 110. The memory 120 is connected to the processor 110 and stores various types of information for operating the processor 110. The RF unit 130 is connected to the processor 110, transmits and/or receives an RF signal.

The MS 200 includes a processor 210, a memory 220, and an RF unit 230. The processor 210 may be configured to implement the functions, procedures and/or methods proposed by the present invention. Layers of a wireless interface protocol may be implemented by the processor 110. The memory 220 is connected to the processor 210 and stores information related to operations of the processor 210. The RF unit 230 is connected to the processor 210, transmits and/or receives an RF signal.

The memories 120 and 220 may be located inside or outside the processors 110 and 210 and may be connected to the processors 110 and 210 through various well-known means. The BS 100 and/or MS 200 may include a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A method for transceiving a signal through at least two data streams in a wireless communication system supporting multi cells, the method performed by a first base station and comprising:

measuring a wireless channel state for a link with a second base station by using an orthogonal pilot signal;
receiving channel status information related to a link of a first mobile station from the first mobile station;
receiving channel status information related to a link of a second mobile station from the second mobile station;
receiving channel status information related to a device-to-device (D2D) link from the second mobile station, wherein the D2D link is a channel link between the first mobile station and the second mobile station;
exchanging the received channel status information with the second base station, the first mobile station and the second mobile station using a broadcast signal; and
determining data stream directions of the first base station and the second base station based on the exchanged channel status information, channel state quality information of the data streams, fixed-rate coding information and information related to a sum-rate of the fixed-rate coding information.

2. The method of claim 1, wherein the D2D link is controlled by the first base station or the second base station.

3. The method of claim 1, wherein a frequency used in the D2D link is equal to a frequency of a base station controlling the D2D link.

4. A method for transceiving a signal through at least two data streams in a wireless communication system supporting a device-to-device (D2D) communication, the method performed by a first mobile station and comprising:
measuring a channel state for one or more neighbor mobile stations by using a pilot signal;
exchanging the measured channel state information with the one or more neighbor mobile stations;
determining at least one pair of transmitting mobile station-receiving mobile station for a best D2D communication based on the exchanged channel state information;
randomly initiating data stream directions of the mobile stations in each pair of the mobile stations;
computing an interference reduction value $\Delta_n$ at each pair of the mobile stations when any of the mobile stations fails a decoding of a data stream; and
updating the data stream directions of the mobile stations in each pair of the mobile stations by comparing the computed interference reduction value $\Delta_n$ and a predetermined value.

5. The method of claim 4, wherein the interference reduction value $\Delta_n$ is determined as follows:

$\Delta_n = \text{SINR}(\overline{D}) - \text{SINR}(D_n)$, where SINR denotes a Signal to Interference-plus-Noise Ratio, $D_n$ denotes a direction of an n-th data stream, 0 represents a forward direction of a data stream and 1 represents a reverse direction of a data stream, and a complementary value of $D_n$ is represented by $\overline{D_n}$.

6. The method of claim 4, wherein the updating the data stream directions comprises:
when the interference reduction value $\Delta_n$ is greater than or equal to the predetermined value, the data stream directions of the mobile stations in each pair of the mobile stations are changed to an opposite direction; and
when the interference reduction value $\Delta_n$ is smaller than the predetermined value, the data stream directions of the mobile stations in each pair of the mobile stations are not changed to the opposite direction.

7. The method of claim 4, wherein the predetermined value is 0.

8. The method of claim 4, further comprising:
transmitting a state value of the updated data stream directions to one or more neighbor mobile stations.

9. The method of claim 4, further comprising:
changing the data stream directions a predetermined number of times;
turning off a data stream of a mobile station when a decoding of the data stream of the mobile station fails when the changing the data stream directions are executed by the predetermined number of times;
checking whether data streams of the one or more neighbor mobile stations are all successful for decoding through binary feedback information; and
deactivating the data stream of the mobile station when any one of the data streams of the one or more neighbor mobile stations is successful for decoding as a result of the checking.

10. The method of claim 1, wherein the channel status information related to the D2D link is transmitted from the first mobile station to the second mobile station.

11. The method of claim 1, wherein the measuring the wireless channel state comprises:
receiving a reference signal for measuring a channel state of a wireless link related to the second base station from the second base station; and
transmitting channel status information of the wireless link to the second base station using a wired backhaul or a wireless backhaul.

12. The method of claim 11, wherein information related to the reference signal is predetermined between the first base station and the second base station.

13. The method of claim 12, wherein the information related to the reference signal comprises at least one of a period for transmitting the reference signal, a type of the reference signal or an antenna port number.

* * * * *